(12) United States Patent
Mark et al.

(10) Patent No.: US 12,290,782 B2
(45) Date of Patent: May 6, 2025

(54) SYSTEMS AND METHODS FOR SEQUENCING OPERATION OF COMPRESSED AIR DRYERS

(71) Applicant: Ingersoll-Rand Industrial U.S., Inc., Davidson, NC (US)

(72) Inventors: Henry Y. Mark, Philadelphia, PA (US); Randy Eng, Davidson, NC (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 0 days.

(21) Appl. No.: 18/653,510

(22) Filed: May 2, 2024

(65) Prior Publication Data

US 2024/0278173 A1  Aug. 22, 2024

Related U.S. Application Data

(63) Continuation of application No. 18/310,247, filed on May 1, 2023, now Pat. No. 11,998,873, which is a continuation of application No. 17/202,091, filed on Mar. 15, 2021, now Pat. No. 11,648,508.

(51) Int. Cl.
  *B01D 53/26* (2006.01)
(52) U.S. Cl.
  CPC ........ *B01D 53/265* (2013.01); *B01D 2257/80* (2013.01)
(58) Field of Classification Search
  CPC .............. B01D 53/265; B01D 2257/80; B01D 2256/10; B01D 2256/12; F04B 39/16; F28D 2021/0038
  See application file for complete search history.

(56) References Cited

U.S. PATENT DOCUMENTS

| 5,664,426 | A | 9/1997 | Lu |
| 2017/0074528 | A1 | 3/2017 | De Piero et al. |

FOREIGN PATENT DOCUMENTS

EP  3148677 A1  4/2017

OTHER PUBLICATIONS

Extended European Search Report for Application No. 22162056.0, dated Aug. 26, 2022.

*Primary Examiner* — Elizabeth J Martin
(74) *Attorney, Agent, or Firm* — Kevin E. West; Advent, LLP (57) ABSTRACT

Compressed air dryer systems are described. In an aspect, a system includes, but is not limited to, a plurality of dryer modules and a controller operable to regulate a run-time of each of the plurality of dryer modules. Each dryer module is configured to direct a portion of cooling medium past a stream of compressed air. Each dryer module includes a temperature sensor in thermal communication with the portion of cooling medium, and a chiller configured to reduce a temperature of the portion of cooling medium based on the sensed temperature and a temperature set-point. The controller communicatively is coupled with the plurality of dryer modules and operable to monitor a plurality of run-times. Each run-time is associated with a corresponding dryer module. The controller is further operable to direct operation of each dryer module based on its run-time by modifying the temperature set-point of the dryer module.

20 Claims, 5 Drawing Sheets

FIG. 1

| Temperature Set-Point Table | | | | | | | |
|---|---|---|---|---|---|---|---|
| | Number of Modules Selected | | | | | | |
| Module # | 8 | 7 | 6 | 5 | 4 | 3 | 2 |
| 1 | SP | SP | SP | SP | SP | SP | SP |
| 2 | SP | SP | SP | SP | SP+Diff | SP+Diff | SP+3*Diff |
| 3 | SP+Diff | SP+Diff | SP+Diff | SP+Diff | SP+2*Diff | SP+3*Diff | |
| 4 | SP+Diff | SP+Diff | SP+Diff | SP+2*Diff | SP+3*Diff | | |
| 5 | SP+2*Diff | SP+2*Diff | SP+2*Diff | SP+3*Diff | | | |
| 6 | SP+2*Diff | SP+2*Diff | SP+3*Diff | | | | |
| 7 | SP+3*Diff | SP+3*Diff | | | | | |
| 8 | SP+3*Diff | | | | | | |

Set-Point = SP; Temperature Differential = Diff

FIG. 2A

If 8 Modules Selected; SP=32°F; 1°F Diff

| Temp Order | Module # |
|---|---|
| 33 | 1 |
| 33 | 2 |
| 34 | 3 |
| 34 | 4 |
| 35 | 5 |
| 35 | 6 |
| 36 | 7 |
| 36 | 8 |

FIG. 2B

| Temp Set-Point | Module # | Runtime (hours) | Module # | Runtime (hours) | Module # | Runtime (hours) | Module # | Runtime (hours) |
|---|---|---|---|---|---|---|---|---|
| 33 | 1 | 500 | 2 | 400 | 2 | 500 | 3 | 500 | 5 | 400 |
| 33 | 2 | 400 | 3 | 300 | 3 | 400 | 4 | 400 | 6 | 350 |
| 34 | 3 | 300 | 4 | 300 | 4 | 400 | 5 | 400 | 7 | 300 |
| 34 | 4 | 300 | 5 | 200 | 5 | 300 | 6 | 250 | 8 | 275 |
| 35 | 5 | 200 | 6 | 150 | 6 | 250 | 7 | 300 | 1 | 200 |
| 35 | 6 | 150 | 7 | 100 | 7 | 200 | 8 | 275 | 2 | 100 |
| 36 | 7 | 100 | 8 | 75 | 8 | 175 | 1 | 200 | 3 | 0 |
| 36 | 8 | 75 | 1 | 0 | 1 | 100 | 2 | 100 | 4 | 0 |

Runtime Threshold = 500 hours

SYSTEMS AND METHODS FOR SEQUENCING OPERATION OF COMPRESSED AIR DRYERS

BACKGROUND

Compressed air systems can utilize heat exchange systems to dry compressed air by condensing and removing moisture to output a dried compressed air stream. The heat exchange systems can use a cooling medium to facilitate heat transfer from the compressed air to the cooling medium. The warmed cooling medium can then be discarded or rechilled for future use.

SUMMARY

Compressed air dryer systems are described. In an aspect, a system includes, but is not limited to, a storage tank, a single cooling medium header, a plurality of dryer modules, and a controller operable to regulate a run-time of each of the plurality of dryer modules. The storage tank is configured to hold a cooling medium in a fluid state within an interior of the storage tank. The single cooling medium header is fluidically coupled with the storage tank. The plurality of dryer modules is fluidically coupled with each of the single cooling medium header and the storage tank. Each dryer module is configured to direct a portion of cooling medium received from the single cooling medium header past a stream of compressed air and back to the storage tank. Each dryer module includes a temperature sensor in thermal communication with the portion of cooling medium and a chiller configured to reduce a temperature of the portion of cooling medium when the sensed temperature exceeds a temperature set-point. The controller is communicatively coupled with the plurality of dryer modules and operable to monitor a plurality of run-times. Each run-time is associated with a corresponding dryer module. The controller is further operable to regulate each run-time by modifying the temperature set-point of corresponding the dryer module.

In an aspect, a system includes, but is not limited to, a plurality of dryer modules and a controller operable to regulate a run-time of each of the plurality of dryer modules. Each dryer module is configured to direct a portion of cooling medium past a stream of compressed air to condense at least a portion of moisture held in the first stream of compressed air. Each dryer module includes a temperature sensor in thermal communication with the portion of cooling medium, and a chiller configured to reduce a temperature of the portion of cooling medium based on the sensed temperature and a temperature set-point. The controller communicatively is coupled with the plurality of dryer modules and operable to monitor a plurality of run-times. Each run-time is associated with a corresponding dryer module. The controller is further operable to direct operation of each dryer module based on its run-time by modifying the temperature set-point of the dryer module.

In an aspect, a method for regulating the run-time of a plurality of compressed air dryer modules includes, but is not limited to, operating a first dryer module, based on a first temperature set-point, to regulate a temperature of a first portion of cooling medium being circulated through the first dryer module; operating a second dryer module, based on a second temperature set-point, to regulate a temperature of a second portion of cooling medium being circulated through the second dryer module; monitoring, via a controller, a first run-time associated with operation of the first dryer module and a second run-time associated with operation of the second dryer module; and modifying, via the controller, the first temperature set-point and the second temperature set-point to regulate the first run-time and the second run-time, respectively.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Overview

Compressed air systems treat a source of air, such as environmental air, by compressing the air to provide a source of compressed air for work applications. The air may have moisture present following treatment by the compressed air system, such as due to humidity conditions in the environment supplying the source air. Moisture can be detrimental to various compressed air applications, such as by posing a risk for machines that utilize the compressed air, products treated by application of the compressed air, products produced with the compressed air, and the like. For example, moisture in compressed air can contribute to risks for rust, corrosion, contamination, bacterial growth, dilution, and the like. To reduce the amount of moisture present in compressed air, compressed air systems can include or be coupled with heat exchange systems to remove moisture through condensation of moisture and separation of the condensation from the flow of compressed air. The heat exchange systems can circulate a cooling medium, such as water, glycol, synthetic refrigerant, or the like, to cool a flow of compressed air and heat the cooling medium. The heated cooling medium can then be discarded or chilled to provide cooling for future applications.

Compressed air systems can incorporate multiple heat exchange systems for drying multiple flows of compressed air. For example, compressed air systems can include multiple dryer modules that share a source of cooling medium that is circulated through the modules, and/or multiple independent dryer modules. For systems that share a source of cooling medium, the cooling medium can be stored in a storage tank for transfer to the individual dryer modules by one or more pumps. As the dryer modules treat the compressed air, the cooling medium is heated during condensation of the moisture and then subsequently cooled (e.g., by a chiller) and transferred back to the storage tank.

The number of dryer modules in operation may vary based on a load condition of the compressed air system. The system will operate with the minimum number of dryer modules necessary to meet the total compressed air demand. At low load conditions, for example, one module (e.g., the lead module) may be sufficient to meet the compressed air demand of the system, and will operate more frequently than the other dryer modules to maintain a desired temperature of the cooling medium. As the system load increases, additional dryer modules are engaged sequentially to meet the increased compressed air demand. A large compressed air system may operate most frequently at lower load conditions (e.g., nights, weekends, etc.), operating at near full capacity less than 45 percent of the time. Because the dryer modules are engaged sequentially based on the load condition of the system, the run-time (e.g., run-hours) of each dryer module varies, with some dyer modules (e.g., the lead module) operating more frequently than other modules. This disparate run-time between dryer modules results in varied mechanical and electrical wear on the dryer modules and their components, and can decrease the operating life of modules with high run-time.

Accordingly, the present disclosure is directed, at least in part, to systems and methods for regulating run-time in compressed air systems operating multiple dryer modules. In an aspect, each of the dryer modules includes a temperature sensor in thermal communication with the cooling medium circulating through the dryer module; and a chiller configured to reduce a temperature of the portion of cooling medium based on the sensed temperature and a temperature set-point. A controller is operable to monitor the run-time (e.g., run hours) of each of the dryer modules. The controller regulates operation of each of the dryer modules based on its run-time by modifying the temperature set-point of the dryer modules. In some aspects, each dryer module will have a unique temperature set-point selected to match the required cooling load of the system, and the dryer modules will operate sequentially based on a hierarchy of temperature set-points. By modifying the temperature set-points, the controller is operable to adjust each dryer module's position in the sequence of operation to achieve a desired run-time for each module, for example, to achieve equivalent run-time of the dryer modules. Operating the dryer modules with run-time can facilitate uniform mechanical and electrical wear on the modules, enhancing the reliability and operating life of each module and its components, and reducing the incidence of premature module failures.

Example Implementations

Figure 1:
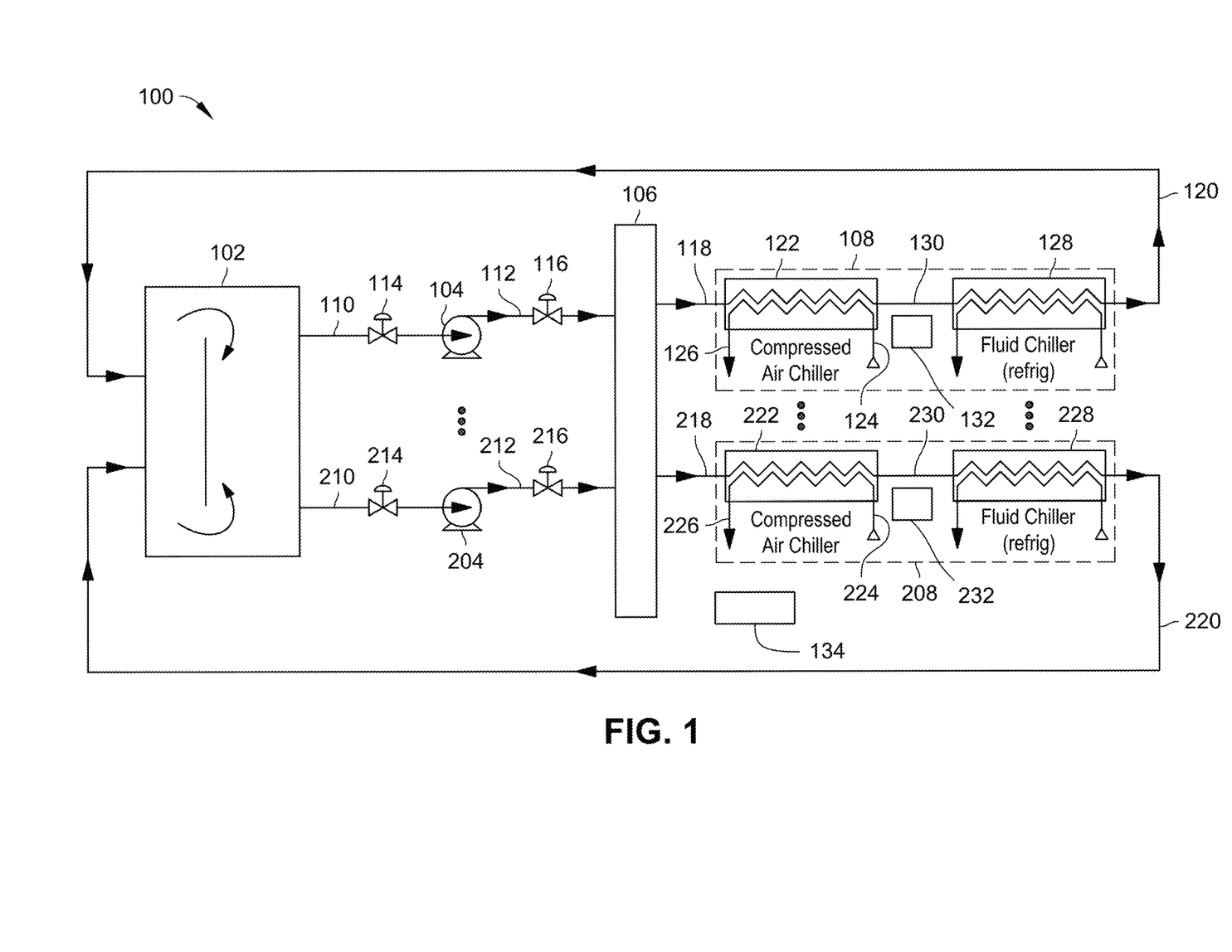
FIG. 1 is a schematic illustration of a compressed air dryer system in accordance with in accordance with embodiments of the present disclosure.

Referring generally to FIG. 1, a compressed air dryer system 100 for regulating run-time of a plurality of dryer modules for drying a plurality of compressed air streams is described in accordance with example embodiments of the present disclosure. In some embodiments, the system 100 includes a shared cooling medium that is distributed to the plurality of drying modules. The system 100 is shown including a storage tank 102, a circulation pump 104, a cooling medium header 106, a dryer module 108, a circulation pump 204, and a dryer module 208. The system 100 distributes a cooling medium from the storage tank 102 to the cooling medium header 106 for supply to each dryer module fluidically coupled with the cooling medium header 106 to condense moisture carried in flows of compressed air through the dryer modules. In FIG. 1, each of dryer module 108 and dryer module 208 are fluidically coupled with the cooling medium header 106 to receive cooling medium flowed therethrough. While FIG. 1 shows two dryer modules fluidically coupled with the cooling medium header 106 (e.g., dryer module 108 and dryer module 208), the system 100 is not limited to such configurations. For instance, the system 100 can include more than two dryer modules fluidically coupled with the cooling medium header 106, including, but not limited to, three dryer modules, four dryer modules, five dryer modules, six dryer modules, seven dryer modules, eight dryer modules, more than eight dryer modules, or the like.

The storage tank 102 holds a volume of cooling medium suitable for distribution throughout the system 100 to condense moisture carried in flows of compressed air through the dryer modules. The capacity of the storage tank 102 can depend on the type of cooling medium utilized, the number of dryer modules, the throughput of compressed gas processed by the system 100, and the like. In example implementations, the storage tank 102 holds a volume of approximately 70 gallons to approximately 300 gallons to support from two to eight dryer modules for an air capacity of approximately 3,500 standard cubic feet per minute (SCFM) of compressed air to approximately 25,000 SCFM of compressed air. Alternatively or additionally, the system 100 can include a plurality of storage tanks 102 to store cooling medium for the dryer modules, for example, where a first storage tank 102 can provide cooling medium to a first subset dryer modules of the system 100, a second storage tank 102 can provide cooling medium to a second subset dryer modules of the system 100, and so on. In implementations, the plurality of storage tanks 102 include a single common cooling medium header 106. Alternatively, the plurality of storage tanks 102 include different cooling medium headers 106 for the individual subsets of dryer modules.

The storage tank 102 stores the cooling medium following refrigeration of the cooling medium by the dryer modules. In implementations, the storage tank 102 is thermally insulated to maintain the cooling medium at a cold temperature to provide a pressure dew point in the dryer modules from about 40° F. to about 32° F. The cooling medium can include, but is not limited to, a glycol-based medium (e.g., propylene glycol, ethylene glycol, etc.), water, a synthetic refrigerant, or combinations thereof. For example, the cooling medium can include a blend of glycol with water in a volumetric ratio of about 1:2.

A plurality of circulation pumps draws cooling medium from the storage tank 102 and supplies the cooling medium to the cooling medium header 106. While FIG. 1 shows two circulation pumps coupled between the storage tank 102 and the cooling medium header 106 (e.g., circulation pump 104 and circulation pump 204), the system 100 is not limited to such configurations. For instance, the system 100 can include more than two circulation pumps fluidically coupled between the storage tank 102 and the cooling medium header 106, including, but not limited to, three circulation pumps, four circulation pumps, five circulation pumps, six circulation pumps, seven circulation pumps, eight circulation pumps, more than eight circulation pumps, or the like. In implementations, the system 100 includes one or more pumps for each dryer module fluidically coupled with the storage tank 102. Multiple circulation pumps can provide redundancy of flow of cooling medium to the cooling medium header 106, which can ensure continuous flow of cooling medium in events where one or more circulation pumps are offline or otherwise not pumping fluid (e.g., during a maintenance activity, loss of power, failure of one or more components, etc.).

In implementations, each circulation pump is fluidically coupled to each of the storage tank 102 and the cooling medium header 106 via individual fluid lines to supply the cooling medium to the cooling medium header 106 through each of the individual fluid lines during operation of the respective circulation pumps. For example, the circulation pump 104 is fluidically coupled with the storage tank 102 via fluid line 110 and with the cooling medium header 106 via fluid line 112, and the circulation pump 204 is fluidically coupled with the storage tank 102 via fluid line 210 and with the cooling medium header 106 via fluid line 212. In implementations, each of the circulation pumps is operated on a continuous basis to continuously draw cooling medium from the storage tank 102 and direct the cooling medium into the cooling medium header 106. The system can include valves to isolate the circulation pumps during service, to control fluid direction of cooling medium, or the like. For example, the system can include valve 114 between the circulation pump 104 and the storage tank 102, valve 116 between the circulation pump 104 and the cooling medium header 106, valve 214 between the circulation pump 204 and the storage tank 102, valve 216 between the circulation pump 204 and the cooling medium header 106, or combinations thereof.

As shown in FIG. 1, the system 100 can include a single cooling medium header (e.g., cooling medium header 106) during circulation of the cooling medium throughout the system 100. For example, in implementations, the cooling medium made available to the dryer modules and received from the dryer modules is combined in two regions of the system 100. First, the cooling medium is stored and mixed in the storage tank 102. Second, the cooling medium is stored and mixed in the cooling medium header 106 to be made available to each of the dryer module 108 and the dryer module 208. Other regions of the system 100 separate the cooling medium within confined flow paths (e.g., fluid lines 110 and 112, fluid lines 210 and 212, within the dryer module 108, within the dryer module 208, transferred from the dryer module 108 to the storage tank 102, transferred from the dryer module 208 to the storage tank 102). The cooling medium header 106 receives cooling medium from each of the circulation pump 104 and the circulation pump 204, where the cooling medium is permitted to span the length of the cooling medium header 106 to be available to each of the dryer module 108 and the dryer module 208 at the same inlet temperature. The system 100 permits mixture of the cooling medium in the storage tank 102 following receipt from the dryer modules 108 and 208 to provide an initial mixing of streams of cooling medium that may be at different temperatures dependent on the duty experienced by the dryer modules 108 and 208 (e.g., proportional to the flow of compressed air through the respective dryer modules). The cooling medium can again mix in the cooling medium header 106 prior to transfer to the dryer module 108 or the dryer module 208. The cooling medium header 106 can be dimensioned based on the volumetric flow of cooling medium through the system 100, based on the number of dryer modules serviced by the storage tank 102, or the like. In implementations, the cooling medium header 106 includes a capped conduit having an inner diameter from about two inches to about twelve inches, however the system 100 is not limited to such dimensions and can have larger or smaller diameters for the cooling medium header 106 dependent on system throughput.

The dryer modules of the system 100 receive cooling medium from the cooling medium header 106 through individual fluid lines for each dryer module and output used cooling medium to the storage tank 102 through individual fluid lines for each dryer module. For example, dryer module 108 receives cooling medium from the cooling medium header 106 via fluid line 118 and transfers cooling medium (e.g., cooling medium having been heated by heat exchange with compressed air within the dryer module 108) to the storage tank 102 via fluid line 120, whereas dryer module 208 receives cooling medium from the cooling medium header 106 via fluid line 218 and transfers cooling medium (e.g., cooling medium having been heated by heat exchange with compressed air within the dryer module 208) to the storage tank 102 via fluid line 220.

In implementations, the dryer modules first direct the cooling medium received from the cooling medium header 106 into one or more heat exchangers to transfer heat from a stream of compressed air to the cooling medium to cool the compressed air, condense moisture held by the compressed air, and warm the cooling medium. For example, the dryer module 108 directs cooling medium from fluid line 118 into a heat exchanger 122 having an input stream 124 of compressed air that passes by a separated flow of cooling medium to condense moisture held in the compressed air and dry the compressed air for output at 126. Similarly, the dryer module 208 directs cooling medium from fluid line 218 into a heat exchanger 222 having an input stream 224 of compressed air that passes by a separated flow of cooling medium to condense moisture held in the compressed air and dry the compressed air for output at 226. The condensation separated from the compressed air is then removed from the dryer module, such as through an air/moisture separator, water trap, or other separation system.

Warmed cooling medium (or chilled cooling medium if no flow of compressed air is circulated within the dryer module) is transferred from the heat exchanger to a chiller that cools cooling medium in preparation for transfer back to the storage tank 102. For example, the dryer module 108 directs cooling medium from the heat exchanger 122 to a chiller 128 via fluid line 130, and the dryer module 208 directs cooling medium from the heat exchanger 222 to a chiller 228 via fluid line 230. The chillers 128 and 228 can include compressors, condensers, thermal expansions valves, or the like, or combinations thereof, to chill the cooling medium for output to the storage tank 102 via fluid lines 120 and 220, respectively.

In implementations, the dryer modules include temperature sensors (e.g., thermistors, thermocouple, etc.) to determine a temperature of cooling medium to control operation of the chillers. For example, the dryer module 108, 208 can include a temperature sensor in thermal communication with the cooling medium to determine a temperature of cooling medium leaving the heat exchanger 122, 222, where a controller (e.g., module controller 132, 232) of the dryer module 108, 208 directs operation of the chiller 128, 228 to cool the cooling medium if the temperature meets a threshold temperature (e.g., a temperature set-point) for the module 108, 208. It is to be understood that terminology "meeting a threshold temperature" is meant to include meeting or exceeding the temperature set-point. In a specific implementation, the module controller 132, 232 monitors the temperature of the cooling medium that is being circulated to the heat exchanger 122, 222 and will then activate operation of the chiller 128, 228 as the temperature rises above the desired temperature set-point for each module 108, 208. Once the temperature of the cooling medium returns to the temperature set-point, the module controller 132, 232 deactivates operation of the chiller 128, 228.

In some implementations, each dryer module 108, 208 will have a unique temperature set-point selected to match the required cooling load of the system 100, and the dryer modules 108, 208 will operate sequentially based on a hierarchy of temperature set-points. For example, operation of dryer module 108 is directed based on a first temperature set-point (e.g., a base temperature set-point), and operation of dryer module 208 is directed based on a second temperature set-point that is offset from the base temperature set-point. Dryer module 108 will be activated first when the temperature of the cooling medium reaches (or exceeds) the base temperature set-point, and dryer module 208 will be subsequently activated when the temperature of the cooling medium meets (or exceeds) the second temperature set-point. In such implementations, the dryer module with the lowest temperature set-point (e.g., the lead module) will have the highest operating frequency, while the dryer module with the highest temperature set-point will have the lowest operating frequency.

In some implementations, the offset temperature set-point(s) are determined based on a temperature differential between each module. For example, there may be an operating temperature differential of 0.5° F., 1.0° F., 1.5° F., 2.0° F., 2.5° F., 3.0° F., 3.5° F., 4.0° F., 4.5° F., 5.0° F., or the like, between each dryer module. In a specific embodiment, the first dryer module 108 has a base temperature set-point, and the second dryer module 208 has a temperature set-point of the base temperature set-point plus the operating temperature differential. Depending on the number of dryer modules and the load requirements of the system 100, the operating temperature differential may be a fixed temperature differential, an incremental temperature differential, or an exponential temperature differential. As the load of the system 100 increases, dryer modules are sequentially activated based on the next-lowest temperature set-point to meet the total compressed air demand. It is to be understood that while the dyer modules are generally activated sequentially as the load of the system 100 increases, the total compressed air demand may necessitate that two or more dryer modules be activated simultaneously. Such simultaneous activation can be achieved by assigning the same temperature set-point to the dryer modules.

Alternatively or additionally, the storage tank 102 or another portion of the system 100 can include one or more temperature sensors to control operation of the chillers 128, 228.

In implementations, the system 100 includes a controller 134 that is operable to regulate the run-time of each of the dryer modules 108, 208. For example, the system can include a selected run-time threshold (e.g., operating hour set-point) for the dryer modules 108, 208. In implementations, the run-time threshold can be selected by an operator of the system 100 or preconfigured by a manufacturer. In a specific implementation, the run-time threshold is in the range of 500 hours to 1,000 hours. The controller 134 is operable to monitor a plurality of run-times (e.g., run-hours), each associated with one of the dryer modules 108, 208, and determine when the run-time threshold is met. For example, the controller 134 can compare the run-time of each dryer module 108, 208 to the run-time threshold and determine if the run-time threshold has been met or exceeded. When the controller 134 determines that the dyer module 108, 208 run-time meets the run-time threshold, the controller 134 directs deactivation of the module 108, 208, for example by deactivating the respective chiller 128, 228. It is to be understood that the terminology "determining when the run-time threshold is met" and "meeting the run-time threshold" are meant to include meeting or exceeding the run-time threshold.

In a specific implementation, the system 100 utilizes the techniques described herein to direct operation of the dryer modules 108, 208 such that the run-time for the modules 108, 208 is substantially equivalent. Operating the dryer modules 108, 208 with an equivalent number of run-hours can facilitate uniform mechanical and electrical wear on the modules 108, 208, enhancing the reliability and operating life of each module 108, 208 and its components, and reducing the incidence of premature module failures.

In implementations, the controller 134 includes a sequencer operable to regulate the run-time of the dryer modules 108, 208 by modifying the temperature set-point of each module 108, 208. For example, when the run-time of a dryer module 108, 208 meets the run-time threshold, the controller 134 directs operation of the dyer modules 108, 208 by increasing the temperature set-point of the module 108, 208 such that the respective chiller 128, 228 is deactivated. In implementations, when the run-time for a dryer module meets the run-time threshold the sequencer is operable to modify the temperature set-points for each of the dryer modules based on the run-time for each module. For example, when the lead module reaches the run-time threshold, the sequencer is operable to reset the temperature set-point of the lead module to the bottom of the temperature hierarchy (e.g., by increasing the temperature set-point to the highest temperature set-point of the group of modules). The sequencer is further operable to reset the temperature set-points of the remaining dryer modules, moving each temperature set-point upwards in the temperature hierarchy (e.g., by decreasing the temperature set-point for the respective module) such that the module with next-highest run-time becomes the new lead module. Once a lead module(s) reaches the run-time threshold and is deactivated, the run-time for that module is reset (e.g., to 0 hours). In such implementations, the controller 134 directs operation of the dryer modules such that the module with the highest run-time operates at the highest frequency until the run-time threshold is met.

In some implementations, the sequencer can regulate operation of the dryer modules 108, 208 based on other system load considerations. For example, the controller 134 can direct operation of the dryer modules 108, 208 by modifying the temperature set-point based on time-of-day or other load monitoring parameters to reduce run-time during low load periods.

While FIG. 1 shows controller 134 as an independent control separate from the individual module controllers 132, 232, the system 100 is not limited to such configurations. Alternatively, part or all of the functionality of controller 134 may be integrated into one or more of the module controllers 132, 232. Likewise, part or all of the functionality of the module controllers 132, 232 may be integrated into one or more independent controllers. The controller 134 and/or the module controllers 132, 232 can control the components and functions of systems 100 described herein using software, firmware, hardware (e.g., fixed logic circuitry), manual processing, or a combination thereof. The terms "controller," "functionality," "service," and "logic" as used herein generally represent software, firmware, hardware, or a combination of software, firmware, or hardware in conjunction with controlling the systems 100. In the case of a software implementation, the module, functionality, or logic represents program code that performs specified tasks when executed on a processor (e.g., central processing unit (CPU) or CPUs). The program code can be stored in one or more computer-readable memory devices (e.g., internal memory and/or one or more tangible media), and so on. The structures, functions, approaches, and techniques described herein can be implemented on a variety of commercial computing platforms having a variety of processors. It is to be understood the that the controller 134 and/or the module controllers 132, 232 can include any number of microcontrollers, processors, and/or resident or external memory.

In configurations where controller 134 functions as an independent controller in communication with module controllers 132, 232, controller 134 can be operable to monitor additional operating parameters associated with the individual controllers 132, 232. For example, the controller 134 can monitor a fault condition associated with module controller 132, 232 to identify a defective dryer module. Similarly, the controller 134 can monitor a maintenance condition (e.g., a filter wear condition, drain condition, etc.) associated with module controller 132, 232 to identify a dryer module requiring maintenance. Based on identification of a fault condition and/or a maintenance, the controller 134 may be operable to deactivate the corresponding dryer module and/or its components (e.g., chillers), for example, by directing operation of a switch (e.g., electrical switch, pneumatic switch, etc.), valve, or the like of the dryer module. In a specific implementation, the controller 134 directs operation of an electrical switch output or a low voltage communications interface to deactivate the dryer module. Alternatively or additionally, the controller 134 can direct operation of an electrical or pneumatic switch to energize a shut-off air isolation valve, thereby preventing compressed airflow through the dryer module.

In implementations, the controller 134 can be communicatively coupled with the dryer modules 108, 208 over a communication network. It is further contemplated that dryer module 108 is can be communicatively coupled with dryer module 208 over the communications network. The communication network may comprise a variety of different types of networks and connections that are contemplated, including, but not limited to: wired and/or wireless connections; the Internet; an intranet; a satellite network; a cellular network; a mobile data network; and so forth. Wired communications are contemplated through universal serial bus (USB), RS-485, Ethernet, BACnet, Profibus, serial connections, and so forth. Wireless communications are also contemplated through wireless networks including, but are not limited to: networks configured for communications according to: one or more standard of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; and so on. In a specific implementation, the controller 134 can monitor each dryer module 108, 208 via a wired communications network that is wired in sequence between each of the modules 108, 208.

In implementations, the controller 134 and/or the module controllers 132, 232 can include a user interface for receiving operator input and displaying information to the operator. For example, the user interface may include a display such as an LCD (Liquid Crystal Diode) display, a TFT (Thin Film Transistor) LCD display, an LEP (Light Emitting Polymer) or PLED (Polymer Light Emitting Diode) display, and so forth, configured to display text and/or graphical information such as a graphical user interface. The user interface can also include one or more input/output (I/O) devices (e.g., a keypad, buttons, a wireless input device, a thumbwheel input device, a touchscreen, and so on). The I/O devices may include one or more audio I/O devices, such as a microphone, speakers, and so on.

It is to be understood that while FIG. 1 shows multiple dryer modules 108, 208 with a shared storage tank 102 of cooling medium, the system 100 is not limited to such configurations. Alternatively or additionally, the system 100 can include multiple independent dryer modules that do not share a common store of cooling medium.

Figure 2A:
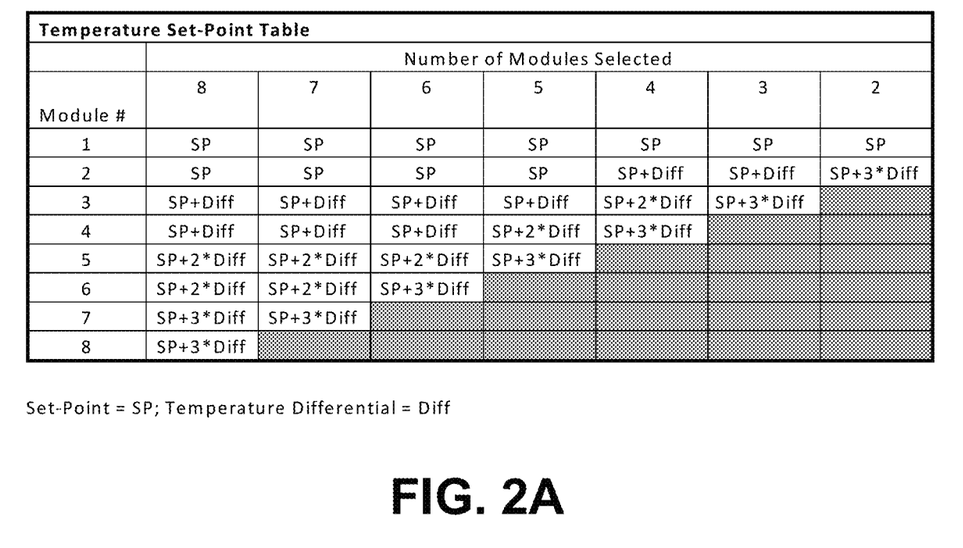
FIG. 2A is a diagram illustrating an example algorithm for regulating run-time of a compressed air dryer system, such as the compressed air dryer system of FIG. 1, in accordance with embodiments of the present disclosure.
Figure 2B:
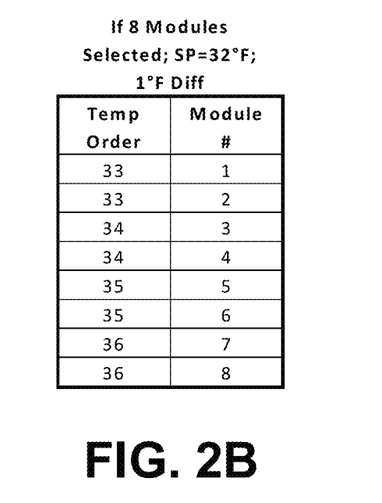
FIG. 2B is another diagram illustrating an example algorithm for regulating run-time of a compressed air dryer system, such as the compressed air dryer system of FIG. 1, in accordance with embodiments of the present disclosure.
Figure 2C:
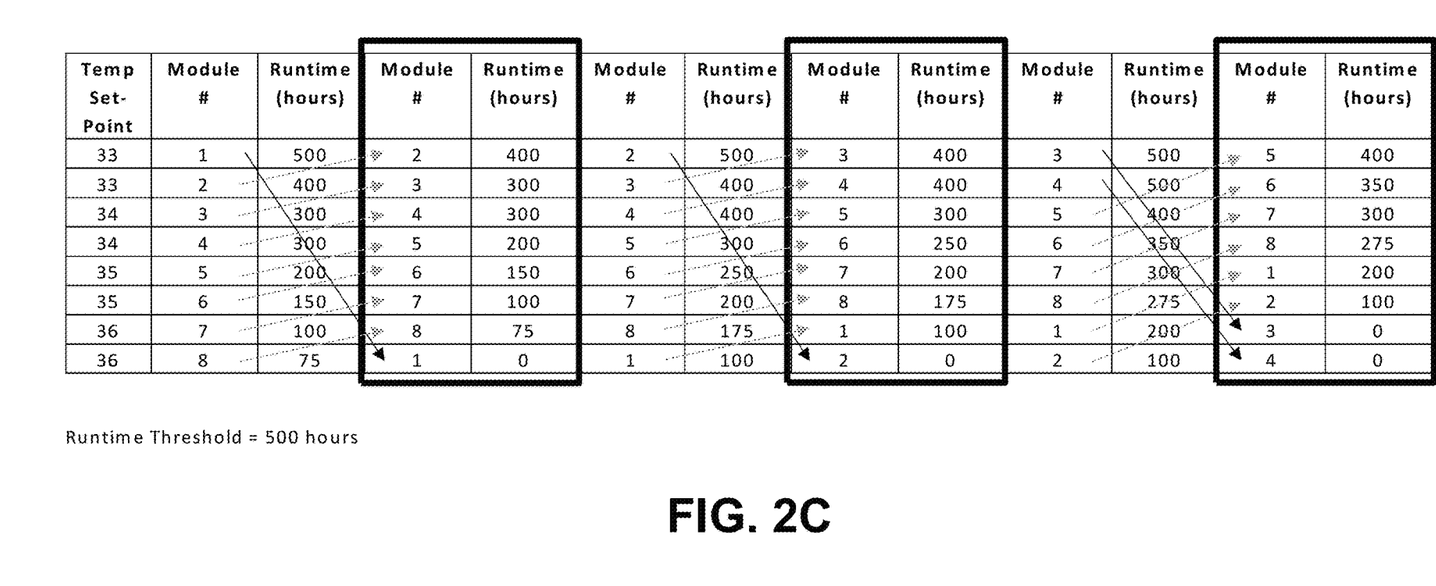
FIG. 2C is another diagram illustrating an example algorithm for regulating run-time of a compressed air dryer system, such as the compressed air dryer system of FIG. 1, in accordance with embodiments of the present disclosure.

FIGS. 2A through 2C illustrate example algorithms that are executable by the controller 134 (e.g., via the sequencer) for determining the temperature set-points for the plurality of dryer modules. The sequencer is operable to execute one or more algorithms or commands to determine a temperature set-point for each dryer module based on the selected base temperature set-point, the selected temperature differential, and the selected number of dryer modules (e.g., as described with reference to FIG. 2A). Based on the number of modules selected, the sequencer determines the temperature set-point for each module by applying an offset from the base temperature set-point that is based on the temperature differential. For example, when two dryer modules are selected, the first module is directed to become operational at the base temperature set-point (SP), and the second dryer module is directed to become operational at an offset temperature set-point based on the selected temperature differential (SP+3*Diff). The sequencer is further operable to execute one or more algorithms or commands to determine a temperature vector ordering the modules in an operating hierarchy based on the temperature set-points (e.g., as described with reference to FIG. 2B). For example, the dryer modules may be arranged in a hierarchy of ascending temperatures such that the lead dryer module (e.g., module 1) is activated at the base temperature set-point, and the other dryer modules are activated in order of ascending temperature set-point. The sequencer is further operable to monitor the run-time (e.g., run hours) of each dryer module and execute one or more algorithms or commands to modify the temperature set-point of each module such that the modules are rotated through the operating hierarchy based on run-time (e.g., as described with reference to FIG. 2C). For example, when module 1 reaches or exceeds the run-time threshold, the sequencer modifies the temperature set-points of the dryer modules such that module is moved to the bottom of the operating hierarchy. In such implementations, the temperature set-point of the lead module (e.g., module 1) is reset to the highest temperature set-point of the temperature vector. The temperature set-points of the other dryer modules are reset such that these modules are moved up the operating hierarchy and the module with the next-highest run-time (e.g., module 2) becomes the lead module with the lowest temperature set-point (e.g., the base temperature set-point). As described above, the total compressed air demand of the system 100 may necessitate that two or more dryer modules be activated simultaneously. As shown in FIGS. 2A through 2C, the sequencer may assign the same temperature set-point to two or more dryer modules to achieve such simultaneous activation needs.

Figure 3A:
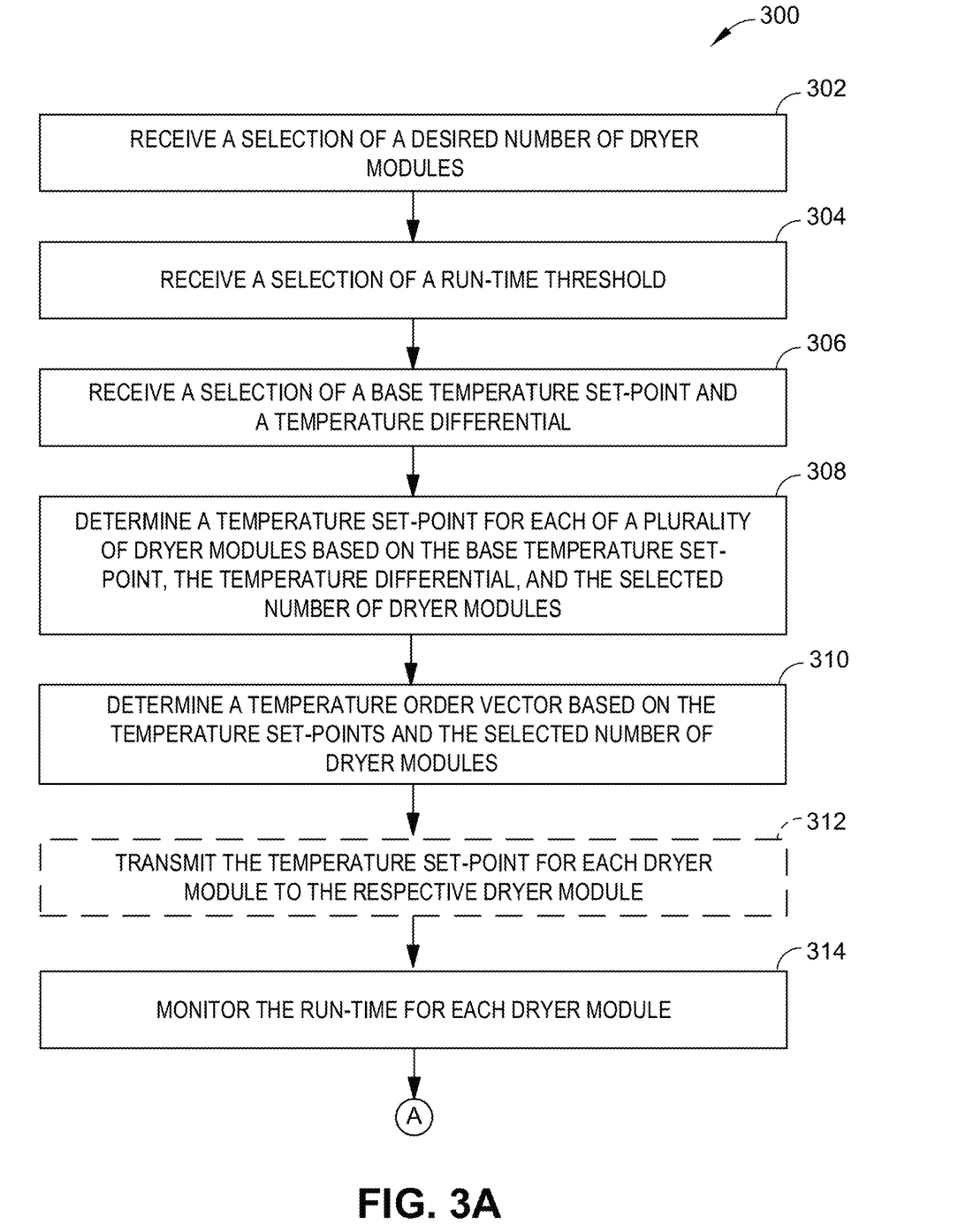
FIG. 3A is an example flow diagram illustrating an example process for regulating the run-time of a compressed air dryer system, such as the compressed air dryer system illustrated in FIG. 1, in accordance with an example implementation of the present disclosure.
Figure 3B:
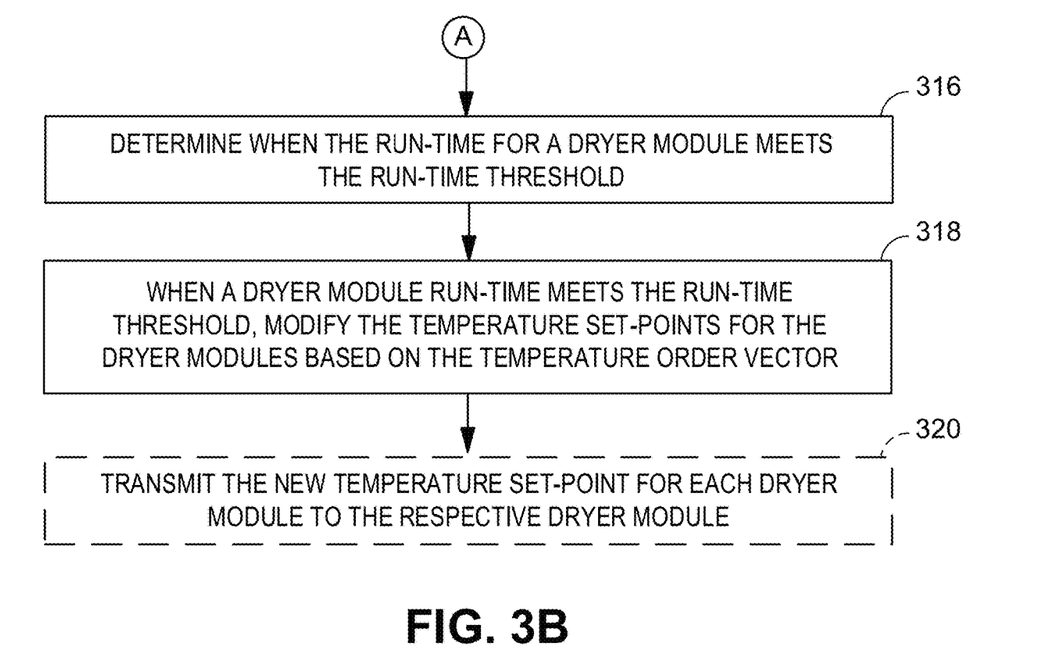
FIG. 3B is another example flow diagram illustrating an example process for regulating the run-time of a compressed air dryer system, such as the compressed air dryer system illustrated in FIG. 1, in accordance with an example implementation of the present disclosure.

FIGS. 3A and 3B illustrate an example process 300 for regulating the run-time of a plurality dryer modules utilizing a compressed air dryer system, such as the compressed air dryer system 100 described above. As shown in FIG. 3A, a selection of a desired number of dryer modules is received (Block 302). In implementations, the desired number of dryer modules can be based on the required cooling-load of the system. For example, under low-load conditions (e.g., evenings, weekends), it may be desirable to utilize fewer dryer modules. The selection of the number of modules can be received as operator input (e.g., via the user interface), and/or as a preconfigured manufacturer setting.

A selection of a run-time threshold is received (Block 304). As described above with reference to FIG. 1, the run-time threshold is a desired run-time limit (e.g., operating hour set-point) for each of the dryer modules 108, 208. In a specific implementation, the run-time threshold is in the range of 500 hours to 1,000 hours. In some implementations, the run-time threshold is selected based operating requirements of the system 100 including, but not limited to system load requirements, compressed air demand, mechanical specifications of the dryer modules, and so forth. The selection of the run-time threshold can be received as operator input (e.g., via the user interface), and/or as a preconfigured manufacturer setting.

A selection of a base temperature set-point and a temperature differential is received (Block 306). As described with reference to FIG. 1, each dryer module 108, 208 will have a unique temperature set-point selected to match the required cooling load of the system 100, and the dryer modules 108, 208 will operate sequentially based on a hierarchy of temperature set-points. For example, operation of dryer module 108 is directed based on a first temperature set-point (e.g., a base temperature set-point). Operation of dryer module 208 is directed based on a second temperature set-point that is offset from the base temperature set-point based on a selected temperature differential. For example, dryer module 208 can have a temperature set-point of the base temperature set-point plus the operating temperature differential. As described above, depending on the number of dryer modules and the load requirements of the system 100, the operating temperature differential may be a fixed temperature differential, an incremental temperature differential, or an exponential temperature differential. The selection of the base temperature set-point and the temperature differential can be received as operator input (e.g., via the user interface), and/or as preconfigured manufacturer settings.

A temperature set-point for each of a plurality of dryer modules is determined based on the base temperature set-point, the temperature differential, and the selected number of dryer modules (Block 308). As described above, based on the number of modules selected, a sequencer determines the temperature set-point for each module by applying an offset from the base temperature set-point that is based on the temperature differential (e.g., as described with reference to FIG. 2A). A temperature order vector is determined based on the temperature set-points and the selected number of dryer modules (Block 310). As described above, the dryer modules can be arranged in a hierarchy of ascending temperatures such that the lead dryer module (e.g., module 1) is activated at the base temperature set-point, and the other dryer modules are activated in order of ascending temperature set-point (e.g., as described with reference to FIG. 2B).

In some implementations, the temperature set-point for each dryer module is transmitted to the respective dryer module (Block 312). As described above with reference to FIG. 1, the sequencer can be included in an independent controller 134 that is operable to transmit the temperature set-point for each dryer module 108, 208 to the module controller 132, 232 corresponding to the module 108, 208 via the communication network (e.g., a wired and/or wireless network). In other embodiments, the sequencer may be integrated into one or more of the module controllers 132, 232.

The run-time for each dryer module is monitored (Block 314). As described above with reference to FIG. 1, the controller 134 is operable to monitor a plurality of run-times (e.g., run-hours), each associated with one of the dryer modules 108, 208. The system can determine when the run-time for a dryer module meets the run-time threshold (Block 316). As described above with reference to FIG. 1, the controller 134 is operable to compare the run-time of each dryer module 108, 208 to the run-time threshold and determine if the run-time threshold has been met or exceeded.

When a dryer module meets the run-time threshold, the temperature set-points for the dryer modules are modified based on the temperature order vector (Block 318). As described above, when a dryer module (e.g., the lead module) reaches or exceeds the run-time threshold, the sequencer is operable to modify the temperature set-points of the dryer modules such that lead module is moved to the bottom of the operating hierarchy (e.g., as described with reference to FIG. 2C). In such implementations, the temperature set-point of the lead module (e.g., module 1) is reset to the highest temperature set-point of the temperature vector. The temperature set-points of the other dryer modules are reset such that these modules are moved up the operating hierarchy and the module with the next-highest run-time (e.g., module 2) becomes the lead module with the lowest temperature set-point (e.g., the base temperature set-point). In some implementations, the new temperature set-point for each dryer module is transmitted to the respective dryer module (Block 320).

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A compressed air dryer system, the system comprising:
a plurality of dryer modules, each of the plurality of dryer modules configured to direct a portion of a cooling medium through a heat exchanger, the heat exchanger configured to transfer heat from a portion of compressed air to the portion of the cooling medium, each of the plurality of dryer modules including:
a temperature sensor in thermal communication with the portion of cooling medium, and
a chiller configured to reduce a temperature of the portion of cooling medium when the sensed temperature exceeds a temperature set-point; and
a controller communicatively coupled with the plurality of dryer modules, the controller operable to monitor a plurality of run-times, each of the plurality of run-times associated with a corresponding one of the plurality of dryer modules, the controller operable to regulate each of the plurality of run-times by modifying the temperature set-point of the corresponding one of the plurality of dryer modules.

2. The system of claim 1, wherein the controller is configured to regulate operation of each of the plurality of dryer modules such that each of the plurality of run-times are equivalent.

3. The system of claim 1, wherein the controller is configured to regulate each of the plurality of run-times based on a run-time threshold.

4. The system of claim 3, wherein the controller is configured to operate each of the plurality of dyer modules sequentially such that a one of the plurality of dryer modules having the highest run-time is operated at the highest frequency until the run-time threshold is met.

5. The system of claim 3, wherein the controller is configured to deactivate one of the plurality of dryer modules when the corresponding one of the plurality of run-times is equal to the run-time threshold.

6. The system of claim 5, wherein the controller is further configured to reset the temperature set-point for the corresponding one of the plurality of dryer modules to a temperature set-point that is the highest temperature set-point of the temperature set-points for the plurality of dryer modules.

7. The system of claim 1, wherein the temperature set-point for one or more of the plurality of dryer modules is based on at least one of a fixed operating temperature differential, an incremental operating temperature differential, or an exponential operating temperature differential.

8. A compressed air dryer system, the system comprising:
a plurality of dryer modules, each of the plurality of dryer modules configured to condense at least a portion of moisture held in a portion of compressed air, each of the plurality of dryer modules including:
a temperature sensor in thermal communication with the portion of cooling medium, and
a chiller configured to reduce a temperature of the portion of cooling medium based on the sensed temperature and a temperature set-point; and
a controller communicatively coupled with the plurality of dryer modules, the controller configured to modify the temperature set-point of each of the plurality of dryer modules based on a corresponding plurality of run-times;
operable to direct operation of each of the plurality of dryer modules based on a corresponding plurality of run-times by modifying the temperature set-point of each of the plurality of dryer modules.

9. The system of claim 8, wherein each of the plurality of dryer modules further includes a module controller configured to regulate operation of the chiller based on the temperature set-point.

10. The system of claim 8, wherein the temperature set-point for one or more of the plurality of dryer modules is based on at least one of a fixed operating temperature differential, an incremental operating temperature differential, or an exponential operating temperature differential.

11. The system of claim 8, wherein the controller is configured to regulate operation of each of the plurality of dryer modules such that each of the plurality of run-times are equivalent.

12. The system of claim 8, wherein the controller is configured to regulate operation of each of the plurality of dryer modules based on a run-time threshold.

13. The system of claim 12, wherein the controller is configured to operate each of the plurality of dyer modules sequentially such that a one of the plurality of dryer modules having the highest run-time is operated at the highest frequency until the run-time threshold is met.

14. The system of claim 12, wherein the controller is configured to deactivate one of the plurality of dryer modules when the corresponding one of the plurality of run-times is equal to the run-time threshold.

15. The system of claim 14, wherein the controller is configured to reset the temperature set-point for the one of the plurality of dryer modules to a temperature set-point that is the highest temperature set-point of the temperature set-points for the plurality of dryer modules.

16. A method for regulating run-time of compressed air dryer modules, the method comprising:
operating a first dryer module, based on a first temperature set-point, to regulate a temperature of a first portion of cooling medium being circulated through the first dryer module;
operating a second dryer module, based on a second temperature set-point, to regulate a temperature of a second portion of cooling medium being circulated through the second dryer module;
modifying, via the controller, at least one of the first temperature set-point and the second temperature set-point to regulate at least one of the first run-time and the second run-time, respectively.

17. The method of claim 16, further comprising:
sensing the temperature of the first portion of cooling medium via a first temperature sensor in thermal communication with the first portion of cooling medium;
operating a first chiller to reduce the temperature of the first portion of cooling medium based on the sensed temperature obtained from the first temperature sensor;
sensing the temperature of the second portion of cooling medium via a second temperature sensor in thermal communication with the second portion of cooling medium; and
operating a second chiller to reduce the temperature of the second portion of cooling medium based on the sensed temperature obtained from the second temperature sensor.

18. The method of claim 16, wherein the modifying at least one of the first temperature set-point and the second temperature set-point to regulate at least one of the first run-time and the second run-time includes modifying at least one of the first temperature set-point and the second temperature set-point to regulate operation at least one of the first chiller and the second chiller, respectively.

19. The method of claim 16, wherein regulating at least one of the first run-time and the second run-time includes regulating operation of at least one of the first dryer module and the second dryer module based on a run-time threshold.

20. The method of claim 16, wherein regulating at least one of the first run-time and the second run-time includes regulating operation regulating at least one of the first dryer module and the second dryer module such that the first run time and the second run-time are equivalent.

* * * * *